UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

MOLDING COMPOSITION.

1,300,218.

Specification of Letters Patent.

Patented Apr. 8, 1919.

No Drawing.

Application filed April 12, 1915. Serial No. 20,752.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Molding Compositions, of which the following is a specification.

My invention relates to the manufacture of molded materials and it has special reference to compositions that are adapted for use in the manufacture of molded electrical insulation.

The objects of my invention are to prepare novel, effective and inexpensive materials of high insulating efficiency and to form such materials into molded articles which shall have superior physical properties.

My novel molding compositions are prepared from inert fillers such as asbestos, wood flour and the like, united into a solid mass by means of certain resinous binders which I have found to be particularly well suited to this purpose.

The binders which I prefer to employ are resinous products of the partial or complete polymerization of certain aromatic carbon compounds, particularly indene, cumaron and their isomers. Both indene and cumaron are produced as such in the fractional distillation of coal tar, and they may also be prepared synthetically. Whether prepared by distillation from coal tar or synthetically, they are readily polymerized by means of sulfuric acid, which, when added to a solution of either or both of these substances, forms a partly polymerized resinous material. In the case of the coal tar distillate, this material is a mixture of paraindene and paracumaron. The partly polymerized resins are readily soluble in many of the usual organic solvents, including coal tar oils such as anthracene oil.

Paraindene and paracumaron, either separately or mixed in any proportions, are excellent binders for the manufacture of electrical insulating material, and they are adapted for use both in hot molding and in cold molding processes. Furthermore, the proportions in which they may be mixed with fillers may be varied to an almost unlimited degree if the treatment to which the molding mixture is subjected is correspondingly altered, as will be hereinafter more fully set forth. The partial and complete polymerization products of the isomers of indene and cumaron are likewise suitable for my use, either singly or mixed.

If a molded material containing a large amount of filler and a small amount of binder is desired, it is sometimes necessary to pre-form the molded articles before the actual molding operation, which should be performed with heat. One satisfactory molding mixture for carrying out this modification of my process is made by mixing about 90% of ground asbestos fibers, about 5% of paraindene, paracumaron or mixtures of these bodies, and about 5% of a polymerizable vegetable oil, such as raw China wood oil. This mixture should be made into a pulp or sludge with a suitable solvent, such as benzol, and pre-formed in the cold in a mold which corresponds in shape to the finished molded articles desired, but which is somewhat larger in size. The material is heated in the pre-forming mold at about 60° C. until the solvent is driven off, after which the pre-formed articles are given the final molding treatment in hot molds, to effect the complete polymerization of the resinous binder and of the vegetable oil. If the binder is added to the original material in a non-polymerized condition, it may be completely polymerized in the hot mold.

It is particularly desirable to add a small quantity of China wood oil to molding mixtures of this character, because this oil increases in volume on polymerizing, and this increase in volume compensates for the shrinkage caused by the expulsion of solvent from the molded articles. Shrinkage in the mold may be entirely obviated by the use of suitable amounts of China wood oil, and solid inserts can therefore be molded directly in the molded articles. The polymerized oil has the further advantage that it renders the final articles exceedingly tough as well as improving their dielectric strength.

A very efficient mixture for cold molding is formed by using about 70 parts of asbestos with about 30 parts of the resinous binders described above. It is also advantageous to add a small amount of China wood oil, as in the case of hot molding mixtures, but much less solvent is used in the cold molding operations and, therefore, 1% or 2% of China wood oil is sufficient to compensate for the shrinkage in the mold. The filler and the resins may be mixed dry or the resins may be first dissolved in a suitable solvent. If the latter course is followed, a solution of resins is preferably sprayed into the filler and thoroughly mixed with it.

If the resins and the binder are mixed in the dry state, the resins should be finely ground and mixed with the filler, the mixture being then sprayed with a small amount of a solvent, which is preferably a mixture of graded solvents, that is to say, solvents of different boiling points, in order that the solvent may not suddenly vaporize within the molded articles, thereby causing warping or distortion of the molded articles, but may come off gradually, the fractions being volatilized in the order of their boiling points. The solvents, when sprayed in small amounts into the mixture of binder and filler, perform the softening effect set forth in my Patent No. 1,286,370, dated Dec. 3, 1918, and assigned to the Westinghouse Electric and Manufacturing Company. The mixture prepared in this manner is dry to the touch but is plastic under pressure and may readily be molded cold in automatic molding machines. After being molded, the pieces are heated in an oven at a temperature of between 100° C. and 120° C. for at least six hours. The heat is then raised to about 200° C. and maintained at this point for twenty-four hours longer, when substantially all of the solvent will have been expelled and the resins and the China wood oil will be completely polymerized.

The amount of binder may be increased considerably above 30%, but the molded pieces must be heated longer, in proportion to such increase in the amount of binder, in order to completely polymerize the binder.

The resinous binders, which I have described above when derived from coal tar are brown in color, and the color of the finished articles may be varied by adding any desired pigment, the color of which will combine with the natural brown color of the binder. Lamp black, for example, may be added to produce dark brown and black articles and ferric oxid may be added to produce dark red molded articles.

The molded materials prepared in accordance with the process described above are exceedingly tough and of high tensile and dielectric strength. They may be cut, turned and polished in any desired manner, and even the cold molded articles leave the mold with a polish which ordinarily will require no additional finishing. It is obvious that the specific examples set forth may be variously modified by persons skilled in the art to which my invention appertains and that many other proportions and filling materials may be employed without departing from the spirit of my invention. It is, therefore, to be understood that my invention comprehends all such modifications, changes and adaptations as fall within the scope of the appended claims.

I claim as my invention:

1. A molding composition comprising a filler, a polymerizable vegetable oil which expands upon polymerization, and a resinous binder that contains at least one of a group of substances including indene, cumaron and their isomers, and the partial polymerization products of the said substances, said binder shrinking upon polymerization, said oil and said binder being combined in such proportion that said shrinking effect is substantially neutralized by said expanding effect in the polymerization of said composition.

2. A molding composition comprising a filler, China wood oil and a resinous binder that contains at least one of a group of substances including, indene, cumaron and their isomers, and the partial polymerization products of the said substances, said binder shrinking upon polymerization, and said oil and said binder being combined in such proportion that said shrinking effect is substantially neutralized by the expansive effect of said oil in the polymerization of the composition.

3. A molding composition comprising comminuted asbestos, China wood oil and a resinous binder that contains at least one of a group of substances including indene, cumaron, paraindene and paracumaron in a partly polymerized condition.

4. A molding composition comprising a filler, a resinous binder that contains at least one of a group of substances including indene, cumaron and their isomers and the polymerization products of the said substances, and a polymerizable vegetable oil, in unpolymerized state, which expands during polymerization, the latter being in such quantity as to substantially counteract the shrinkage which will be caused by expulsion of volatile matter during molding.

5. A molding composition comprising a filler, a resinous binder that contains at least one of a group of substances including indene, cumaron and their isomers and the polymerization products of the said substances and China wood oil in unpolymerized state, in such quantity as to substantially counteract the shrinkage which may be caused by expulsion of volatile matter during molding.

6. A molding composition comprising a filler, a polymerizable impregnator therein which expands upon polymerization, and an additional polymerizable impregnator therein which shrinks upon polymerization, said impregnators being present in such relative proportions that said shrinkage is substantially neutralized by said expansion in the polymerization of the molding composition.

In testimony whereof, I have hereunto subscribed my name this 30th day of March, 1915.

JAMES P. A. McCOY.